Sept. 21, 1965  K. L. SCHULZE  3,207,313
APPARATUS FOR AERATION OF WASTE PRODUCTS
Filed May 10, 1954  5 Sheets-Sheet 1
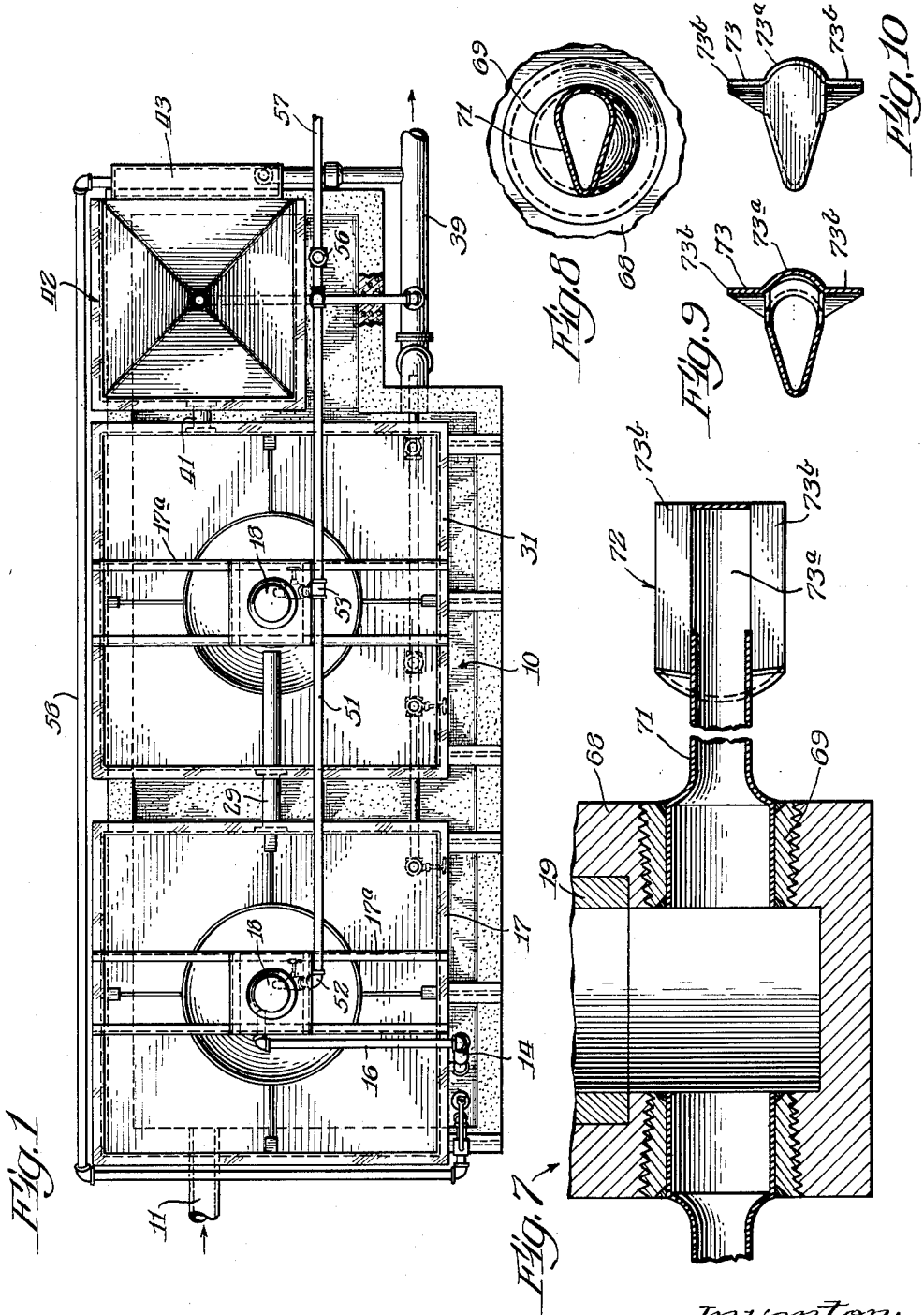
Inventor:
Karl L. Schulze
BY Soans, Glaister & Anderson
Attys Sept. 21, 1965  K. L. SCHULZE  3,207,313
APPARATUS FOR AERATION OF WASTE PRODUCTS
Filed May 10, 1954  5 Sheets-Sheet 2
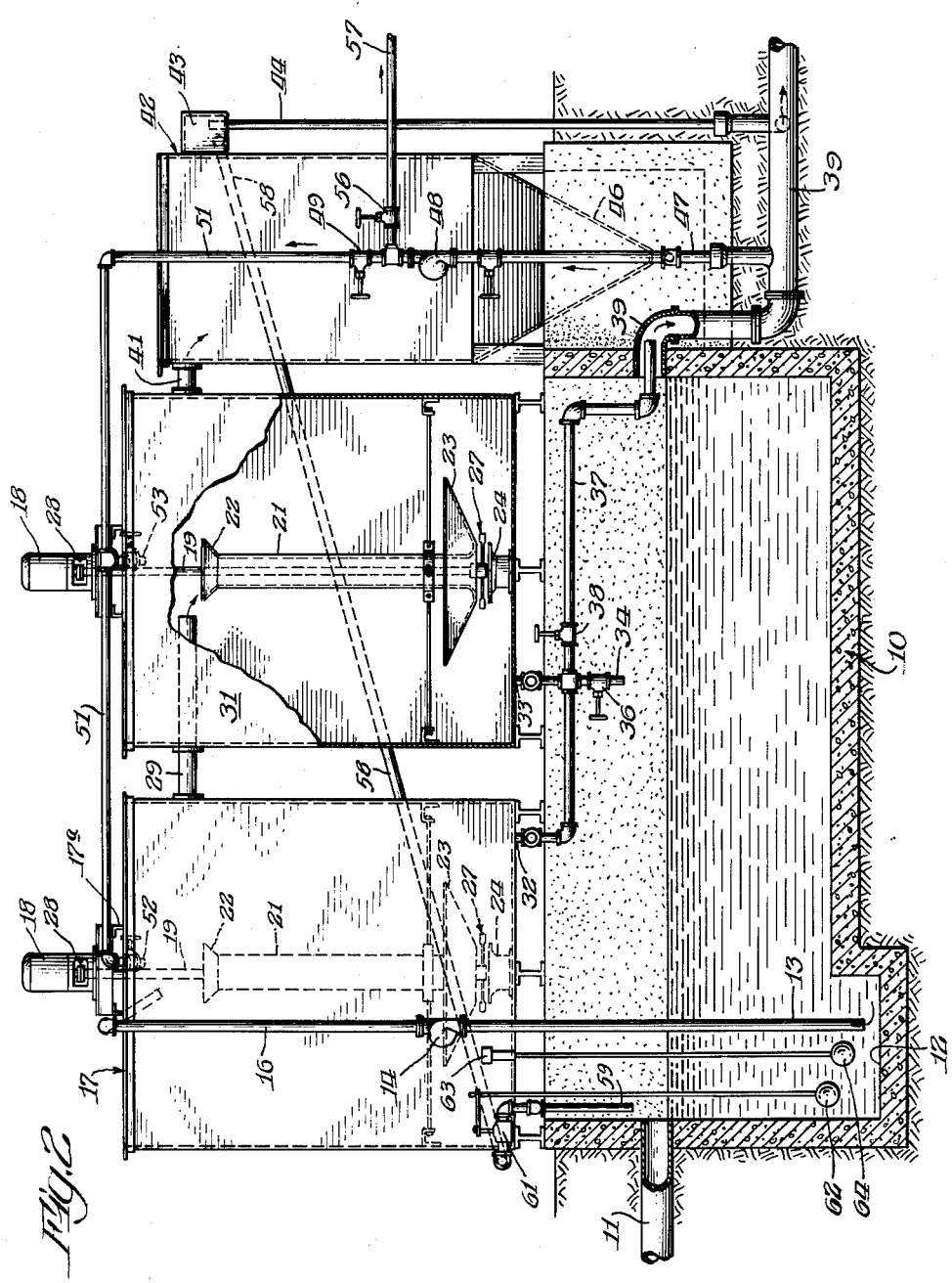
Inventor:
Karl L. Schulze
By Evans, Haister & Anderson
attys.

Sept. 21, 1965 K. L. SCHULZE 3,207,313
APPARATUS FOR AERATION OF WASTE PRODUCTS
Filed May 10, 1954 5 Sheets-Sheet 3
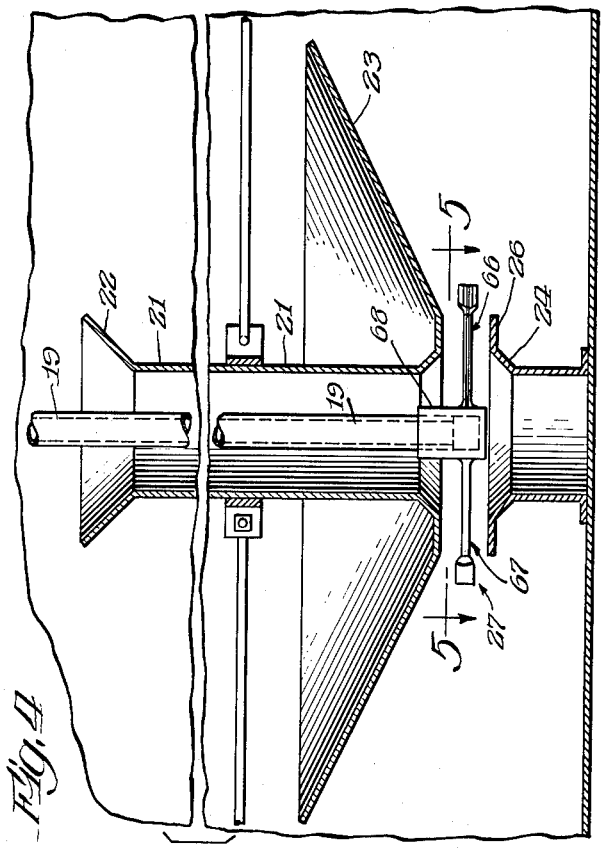
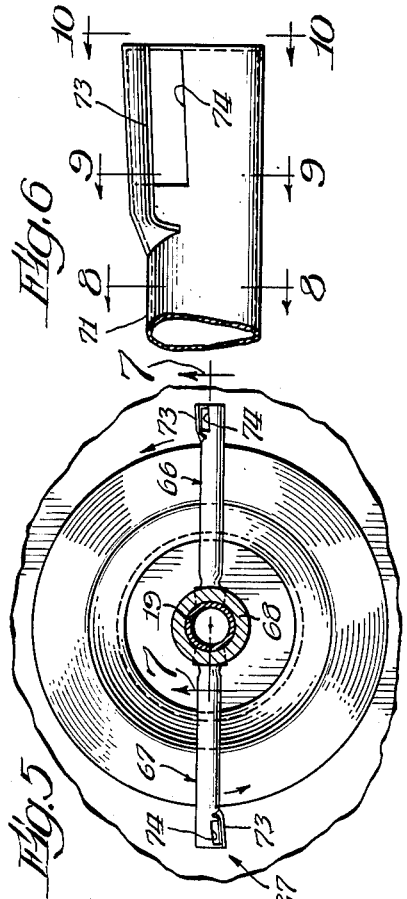
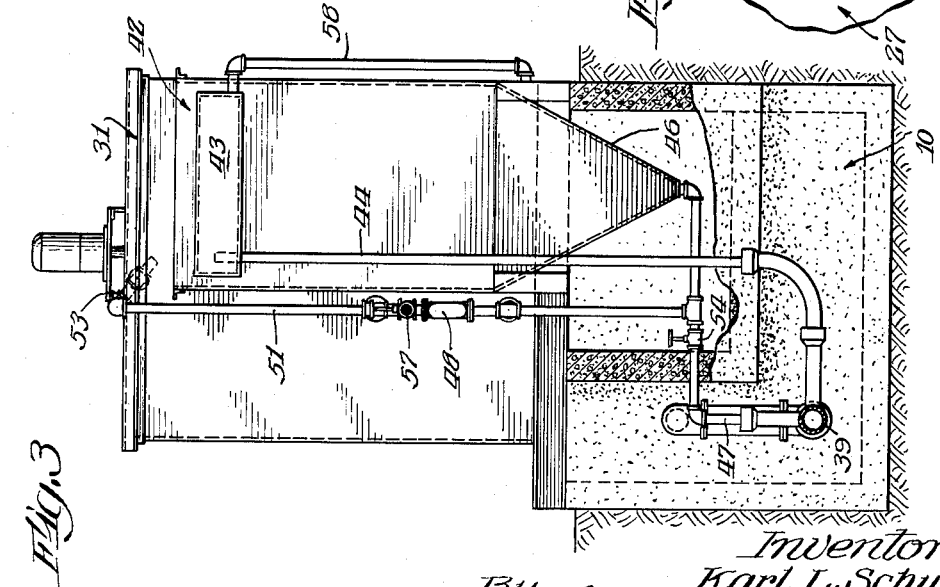
Inventor:
Karl L. Schulze
By Evans, Hester & Anderson
Attys.

Sept. 21, 1965  K. L. SCHULZE  3,207,313
APPARATUS FOR AERATION OF WASTE PRODUCTS
Filed May 10, 1954  5 Sheets-Sheet 4

Inventor:
Karl L. Schulze
By Owens, Glaister & Anderson
Attys.

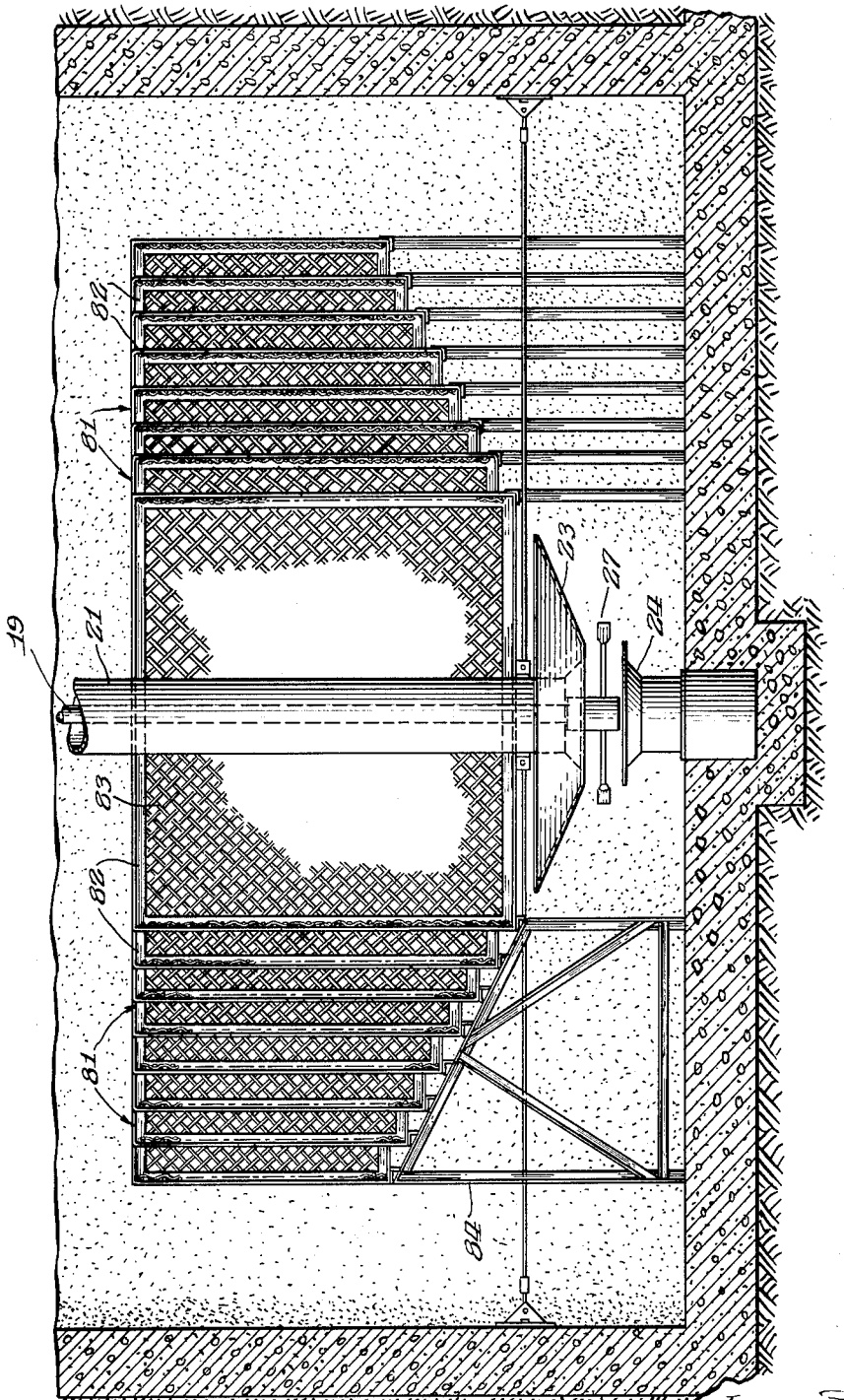

United States Patent Office 3,207,313
Patented Sept. 21, 1965

3,207,313
APPARATUS FOR AERATION OF
WASTE PRODUCTS
Karl L. Schulze, Green Bay, Wis., assignor to International Vibro, Inc., a corporation of Wisconsin
Filed May 10, 1954, Ser. No. 428,510
6 Claims. (Cl. 210—195)

The present invention is directed primarily to an improved aeration system for aerating waste products, and finds particular applicability in the aeration of waste products as a part of the activated sludge process.

One of the most serious problems in the handling of waste products, whether of domestic or industrial origin, is that of rendering the waste product sufficiently innocuous to plant life and fish life so that the waste product may be discharged directly into a natural water course. This difficulty arises because waste products have a characteristic affinity for oxygen, and unless this demand is satisfied, such products will rob water courses of their natural oxygen content to the detriment of the aquatic life growing therein. This natural affinity toward oxygen can be quantitatively measured and is usually expressed as a biological oxygen demand (B.O.D.) in terms of parts of oxygen required to render the waste product innocuous per million parts of waste product.

Naturally, the biological oxygen demands of waste products vary considerably. A typical municipal sewage may have a B.O.D. value of about 100 to about 300 parts per million, whereas the waste product from a cheese making plant may have a B.O.D. of 1,000 to 2,000 parts per million or even more. Since state boards of health generally do not permit the introduction of waste products into lakes or rivers unless the B.O.D. value is on the order of 30 parts per million or less, the problem of securing adequate B.O.D. reduction is one of the most serious in waste disposal, particularly in areas where there are cheese making and similar plants.

One of the most efficient and least expensive processes for the reduction of B.O.D. presently being employed is the activated sludge process. Chiefly, this process consists in first removing the gross solids by screening or other means, settling to remove additional solids, and treating the supernatant liquid with a biologically active sludge recovered from previous processing. This so-called activated sludge contains aerobic organisms which have the ability, in the presence of sufficient oxygen, to react with the oxygen absorbing compounds of the product being treated to form oxygenated derivatives which of themselves are substantially innocuous to plant and animal life. The treatment thereby substantially lowers, if not completely eliminates, the characteristic B.O.D. of the product.

It is important that the mixture of the waste product and the sludge be accomplished by efficient agitation and a sufficient supply of oxygen. In some installations, aeration is accomplished by blowing air into the waste product through porous refractory tubes composed of silicon carbide or similar material. One disadvantage of this type of operation is the fact that a substantial pressure drop occurs in delivering the air through the porous refractory tubes, so that a very substantial power input must be provided for every pound of B.O.D. removed. Another serious disadvantage arises from the inherent tendency of the porous refractory tubes to clog during use; shut downs for tube cleaning or replacement and progressively increasing power requirements result.

Aeration is also accomplished in some installations by mechanical stirring which keeps the waste product in turbulent contact with air at the surface. This process has the disadvantage that only a small amount of the waste product is exposed to the action of the air at any given time, so that the required residence time of the material in the agitator tends to be excessively long. In addition, the power requirements for the agitators employed are frequently so high as to make the system uneconomical.

After aeration of the sludge-waste product mixture, the mixture is allowed to settle so that the sludge may be separated out and a portion thereof used to inoculate raw waste material. The effluent from the settling operation, if sufficiently low in B.O.D., is passed into a water course or otherwise disposed of.

One of the objects of the present invention is to provide a highly efficient system for the treatment of liquids by means of which substantial amounts of gas can be introduced into a liquid in a short time and in a highly reactive or absorbable form.

Another object of the invention is to provide an improved waste treating process in which the power requirements for satisfying a given B.O.D. are substantially less than any commonly used process, making the process very economical.

A still further object of the invention is to provide an improved process for treating waste products having high B.O.D. values in order to satisfy these B.O.D. values in a relatively short time.

A further object of the invention is to provide an improved apparatus, economical to construct and to operate, for aerating liquids.

Before proceeding to a description of the drawings, it would be desirable to analyze the problems concerned in aeration systems generally in order to understand the principles upon which the present invention is based.

The diffusion of air or oxygen into water or other liquid is essentially a surface phenomenon. It appears that when air bubbles are formed in a body of water, the layer of water immediately surrounding a given air bubble is rapidly saturated with oxygen. However, the diffusion of the gas into the remainder of the water is very slow, in accordance with the general principles of diffusion as set forth mathematically in Fick's formula. Hence, it normally requires a relatively long period of time to saturate a body of water with air even though a large excess of air is introduced into the water.

To accomplish efficient aeration would seem to require that the interfacial surfaces between the body of liquid and the air bubbles be replaced as rapidly as possible. The present invention is directed along these lines, and provides a means for achieving gaseous diffusion under reduced pressure conditions, resulting in the rapid and continuous exchange of oxygen between air bubbles and the surrouding water. This unique system greatly accelerates the oxygen utilization rate, resulting in a shorter treating time, as well as reducing the power requirements per unit of B.O.D. removed.

The present invention is based, in part, upon the discovery that very efficient aeration can be accomplished mechanically in a liquid treating system if the liquid is agitated with sufficient force to produce what appear to be regions of cavitation in the liquid, and if air or other oxygen-containing gas is introduced into these regions of cavitation.

Cavitation has been defined as the formation of a cavity between a moving body and a liquid normally in contact with that body. Cavitation most commonly results from the rapid movement of a solid object through a body of liquid, the velocity of the object being so great relative to the liquid that separation of the solid object and the liquid occurs. The accompanying reduced pressure produced in the region of separation causes the formation of the cavitation space or cavity, which space or cavity is occupied by gas or vapor from the surrounding liquid, and will continue to exist until the pressure in the surrounding liquid exceeds the vapor pressure at the existing conditions. Thereupon the cavity collapses or at least is reduced very substantially in size in an extremely short interval of time, usually less than $\frac{1}{1000}$ of a second. This collapse or implosion of the vapor cavities may occur with a considerable shock, frequently resulting in pitting of the moving member.

The phenomenon of cavitation has been observed and analyzed for a long time. However, it was considered to be completely undesirable in liquid pumping and flow systems because it lowers the efficiency of the system, i.e., it reduces the thrust of propellers of turbine wheels, it may decrease the rate of flow of liquids through conduits, etc. Hence, the emphasis in the past has been to reduce or eliminate cavitational effects in any instance where a solid impeller travels through a body of liquid. In line with this thinking, much work has been done on the design of impellers having true air foil contours which do not provide cavitation at the velocities desired for the impeller.

In contrast to this point of view, the present invention provides means for securing controllable regions of cavitation in a liquid under treatment in order that the oxygen introduced into these regions can be utilized with the highest efficiency and at the greatest possible speed. That these conditions have been achieved is indicated by actual tests of systems in accordance with the invention which indicate that the same degree of B.O.D. removal as accomplished with other systems can almost invariably be accomplished with the use of less than one half the air previously used for the same B.O.D. removal, and frequently with one tenth or less of the air previously employed. Similar savings are made in the power requirements for the system.

A further description of the present invention as it has been applied to a plant for the treatment of dairy wastes will be made in connection with the attached sheets of drawings in which:

FIGURE 1 is a plan view of the waste treating installation;

FIGURE 2 is a view in elevation of the installation, with portions thereof broken away to illustrate some of the features of the apparatus;

FIGURE 3 is a side elevational view of the installation;

FIGURE 4 is an enlarged, fragmentary view of the rotor assembly employed;

FIGURE 5 is a view taken along the line 5—5 of FIGURE 4;

FIGURE 6 is a fragmentary view of the end of the rotor;

FIGURE 7 is an enlarged sectional view taken along line 7—7 in FIGURE 5;

Figure 11:
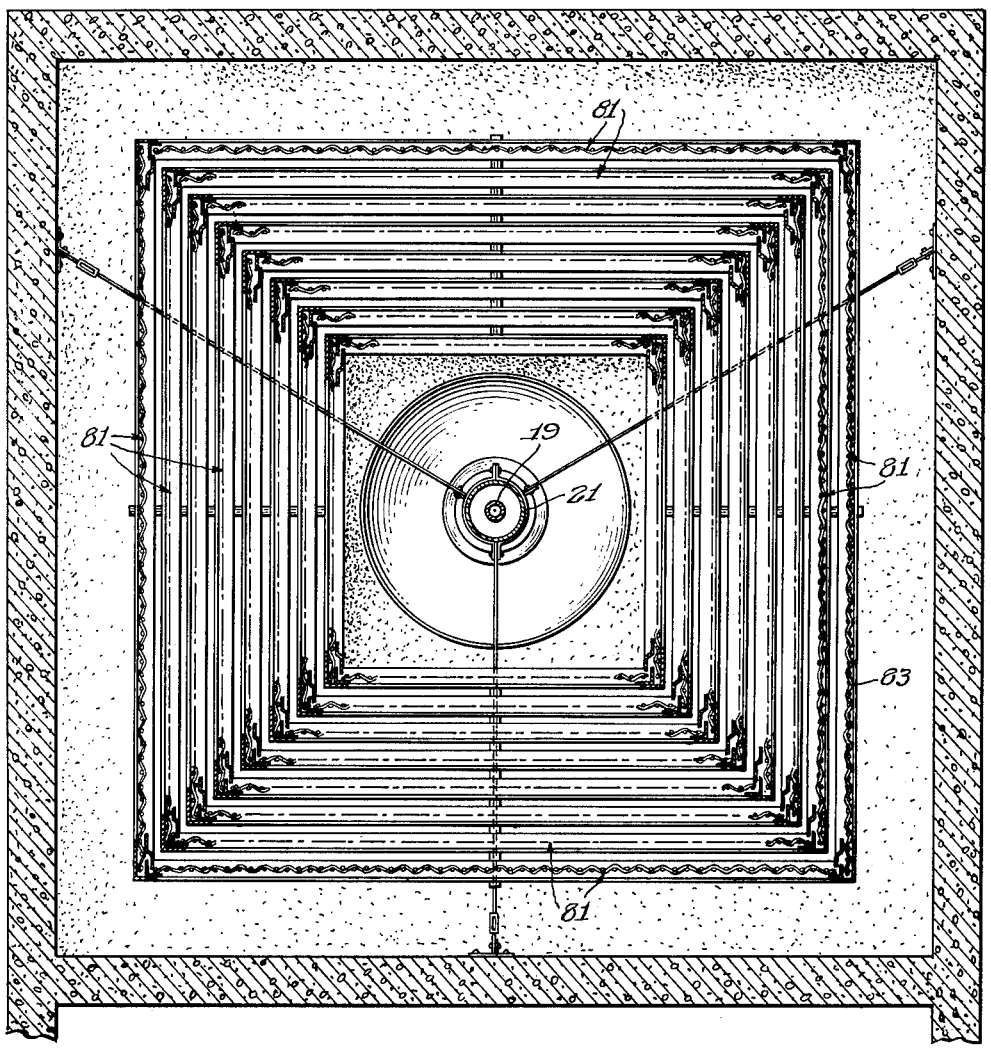

FIGURES 8, 9, and 10 are views taken along the lines 8—8, 9—9, and 10—10, respectively, in FIGURE 6;

FIGURE 11 is a plan view of a modified form of the invention; and

FIGURE 12 is an elevational view of the system of FIGURE 11.

In the drawings, reference numeral 10 indicates generally a holding tank into which the waste product from the dairy plant is introduced through an inlet pipe 11 communicating with the tank 10. The tank 10 is formed with a recessed portion 12 into which extends a pipe 13 for withdrawing the waste material from the holding tank 10 and introducing it into the aeration tanks subsequently to be described. The pipe 13 is connected to the inlet end of an influent pump 14 of sufficient capacity to provide the desired flow rate.

The discharge from the pump 14 is directed by means of an influent pipe 16 into a first aerator tank generally designated at 17 in the drawings. The capacity of the first tank 17 is preferably at least equal to the capacity of the holding tank 10.

The tank 17 is provided with a suitable bridge structure 17a for supporting a vertically disposed motor 18, the motor being arranged to drive a centrally disposed hollow shaft 19, with suitable rotary seals (not shown) being provided between the motor drive shaft and the hollow shaft 19.

The hollow shaft 19 is partially enclosed within a draft tube 21 having a funnel shaped inlet end 22. The draft tube 21 is supported within the tank 17 by suitable tie rods or the like and at its bottom end, is attached to an upwardly flared deflector plate 23 whose diameter is preferably about one half the diameter of the tank 17. The surface of the deflector plate 23 is preferably inclined upwardly at a slight angle, as it has been found that this type of structure facilitates the proper distribution of air bubbles throughout the treating tank, and minimizes the tendency of the bubbles to agglomerate and form larger bubbles.

At the base of the tank 17, spaced from the deflector plate 23 is a stator plate 24 of substantially the same inner diameter as the draft tube 21. As best seen in FIGURE 4, the stator plate 24 has a flanged portion 26 which, with the deflector plate 23, forms a restricted orifice through which the liquid flowing in the annular space between the draft tube 21 and the hollow shaft 19 is expelled radially.

Connected to the hollow shaft 19 and in fluid communication therewith is a rotor assembly generally indicated at numeral 27 in the drawings. A more detailed description of the rotor assembly 27 will be made subsequently, but it will suffice here to say that the rotor 27 is continuously supplied with air during its rotation from an aspirator section 28 associated with the motor 18, and arranged to direct air or other oxygen-containing gas into the interior of the hollow shaft 19 during its rotation. If desired, suitable metering devices and gauges can be included to measure and meter the flow of air into the rotor assembly 27.

In order to achieve the greatly improved results of the present invention, the rotor 27 should be rotated at a velocity sufficient to create a zone of cavitation along the path of rotor. The air from the rotor assembly is introduced into this zone. Naturally, the speed required in the rotor to produce conditions of cavitation will vary widely, depending primarily on the design of the rotor and also upon the volume of air required to treat the particular product. The amount of air effectively supplied to the treating zone, in turn, depends upon the size of the rotor, the static head of material in the treating tank and the type of nozzle on the rotor assembly. For example, with a 17-inch diameter rotor of a particular design, a 7-foot head of liquid, at a velocity of 500 r.p.m., approximately 9.2 cubic feet of air per minute were introduced into the treating tank. With the same rotor and the same head at a velocity of 800 r.p.m., the amount of air which could be drawn into the system was about 21.8 cubic feet per minute.

The rotor velocity of the rotor 27 is sufficient to rotate the whole mass of liquid in the tank 17. The bubbles of air are also given a sufficient velocity so that the bubbles travel radially outwardly a substantial distance toward the walls of the tank 17 before being given a spiral motion by the rotation of the body of liquid. As the body of liquid is rotated within the tank 17, a vortex is set up at the inlet 22 to the draft tube 21 so that particles floating on the surface are drawn into the draft tube 21 for recirculation into the cavitational zone. Any foam produced by the aeration of the material is also collapsed at the inlet 22 of the draft tube 21.

A portion of the circulating liquid may be constantly withdrawn from the tank 17 by means of an outlet pipe 29, and is directed to a second aerator tank 31 where the cycle is repeated. Normally, the construction of the second tank 31 will be substantially identical with the first aerator tank 17. Both aerator tanks 17 and 31 are provided with drains 32 and 33, respectively, through which material being treated can be discharged into the holding tank 10 by means of a line 34 controlled by a valve 36 or to a line 37 controlled by a valve 38. The line 37 discharges into an enlarged outlet pipe 39 which runs to a water course or to some other place of disposal.

In normal operation, a portion of the liquid circulating in the second aerator tank 31 leaves the tank 31 through a discharge line 41 and passes into a settling tank 42 where sludge carried with the liquid is settled out before the treated effluent is discharged. Associated with the settling tank 42 is an outlet box 43 which receives a constant overflow from the settling tank 42. The liquid from the outlet box 43 in normal operation passes by means of a pipe 44 into the outlet pipe 39 to be discharged into the water course. The sludge separated from the liquid material into the settling tank 42 settles into a sludge hopper 46 from which it can be withdrawn by means of a discharge line 47 and recycled by means of a sludge pump 48 through a valve 49 into a distributing line 51 which feeds the tanks 17 and 31 by means of valved lines 52 and 53, respectively. Alternatively, the sludge in the line 47 can be directed through a valve 54 into the outlet pipe 39 or it may be passed from the discharge end of the pump 48 through a valve 56 into a line 57 leading to a sludge bed. In normal operation, the pump 48 will be operated by an automatic timing mechanism so that the sludge is periodically recycled to the aeration tanks at a rate determined by the amount of waste material being treated. In a typical installation, the sludge recirculating pump may run for about fifteen minutes in each hour.

One of the many advantages made possible by the present invention is a substantial decrease in the residence time required to achieve a given B.O.D. reduction. As a result, when using the system of the present invention, a cheese manufacturer, for example, can effectively treat a full day's waste product in sixteen hours or less, leaving a period of eight hours or more in which to prepare for the next treatment period. This recovery period can be used to build up a large dissolved oxygen content in the liquid so that the material introduced at the beginning of the next day will be considerably easier to aerate. In order to accomplish this result, the outlet box 43 is provided with a recirculation pipe 58 which is arranged to discharge by means of a pipe 59 into the holding tank 10. The discharge of the pipe 59 is controlled by means of a normally closed float valve 61 having a float 62 extending into the holding tank 10 in the region of the recess 12. The valve 61 also includes a switch mechanism arranged to initiate the operation of the influent pump 14 when the level of the liquid in the holding tank 10 drops to a predetermined low value at the completion of a day's operation. As the pump 14 is operated, the material is circulated into the aerator tank 17, then into the second aerator tank 31, into the settling tank 42 and finally back to the holding tank 10. During this recirculation, the dissolved oxygen content builds progressively so that less oxygen is required when raw waste material is first introduced into the holding tank at the start of the next day's operation.

As a safety device, a float switch 63 including a float 64 extending below the level of the float 62 may be employed to stop the operation of the pump 14 in the event that the level of the liquid in the holding tank 10 drops to too low a value.

It will be recognized that many different designs of rotors can be employed in the practice of the present invention, provided that the rotor has a characteristic range of velocities in which it will produce a region of cavitation in the liquid. A particularly effective rotor assembly for practicing the present invention is illustrated in detail in FIGURES 4 to 10. The specific rotor details are no part of this invention, as they are described and claimed in a copending application of D. W. Burgoon et al., Serial No. 537,092, filed September 28, 1955, now abandoned.

As best seen in FIGURES 4 and 5, the rotor of the present invention may include a pair of radially extending, diametrically opposed arms 66 and 67. A collar 68 receives the arms 66 and 67 in threaded engagement, the collar being pressed onto or otherwise secured to the hollow shaft 19. The arms 66 and 67 are preferably identical, so a description of one will suffice for all.

The arm 66 has a threaded end portion 69 received in the collar 68, a central portion 71, and a cavitating end portion 72. The latter may include a vane 73 extending forwardly of the rotor in its direction of rotation so as to constitute the leading edge of the rotor. The vane 73 may include a domed central portion 73a, and outwardly flared edge portions 73b on either side of the central portion 73a, as shown in FIGURES 9 and 10.

It has been found highly desirable to localize the areas of cavitation to only a portion of the rotor assembly. Hence, it is desirable that the central portions 71 provide as little resistance as possible to the flow of liquid. Accordingly, it is desirable as shown in FIGURE 8 to provide a streamline contour to the central portions 71 so that no cavitation will occur along these lengths but will be confined to the region of the cavitating end portions 72, thus producing what can be described as an annular zone of cavitation. Also, as shown in the drawings (FIGS. 4 and 5 in particular), this annular zone of cavitation is located below and spaced radially outward with respect to the lower end of draft tube 21 so that liquid from the draft tube moves substantially radially through and past the annular zone of cavitation. With the type of structure shown in FIGURES 5 and 6, the air is supplied through the hollow arms 66 and 67 and injected through openings 74 in the arms immediately behind the vanes 73. With this arrangement, the air is introduced into the regions of cavitation produced by the movement of the cavitating vanes 73 through the liquid. When the rotor assembly is operated at a velocity sufficient to cause cavitation, the separation of the vanes 73 from the body of liquid creates a partial vacuum in the space between the solid and the liquid, into which liquid will vaporize. This condition will exist until a region of higher pressure is reached whereupon the cavities collapse or implode into the liquid with very substantial force, making it possible for the liquid to absorb the gas almost immediately at rates which could not heretofore be achieved in mechanical aerating systems.

Some types of waste products, particularly municipal wastes and meat packing wastes, develop a floc which is long and stringy. In order to use this type of floc effectively, it is desirable that some means be provided for growing the floc without interfering with the normal circulation of liquid. The type of assembly shown in FIGURES 11 and 12 was designed primarily for this type of treatment. The rotor assembly and draft tube may be identical with that discussed in connection with the previous drawing, but in addition, the tank may be provided with a series of screen assemblies 81, each of which includes a framework 82 on which is mounted a wire screen 83 having, for example, a mesh of about one and one-half inches. As best illustrated in FIGURE 12 the screens 82 may be supported on a framework 84 and arranged in staggered relation with the length of the screens decreasing from the center of the tank to the outside. The purpose of this construction is to avoid interference with the path of the bubbles as they leave the rotor.

As a specific example of the benefits to be derived from the present invention, the following table was prepared from typical results obtained when treating a cheese plant waste according to the system of the present invention.

TYPICAL TEST RESULTS

*Cheese plant waste with 55,000 lbs. milk intake*

| | | |
|---|---|---|
| Average 8 hr. flow 14 g.p.m., total | gal | 6720 |
| Holding tank effective capacity, one-half total flow | gal | 3360 |
| Tank detention (2 units) | hours | 16 |
| Final tank detention | do | 2.5 |
| Average 5-day B.O.D. raw | p.p.m | 1200 |
| Average 5-day B.O.D. effluent | p.p.m | 30 |
| Reduction through plant | p.p.m | 1170 |
| B.O.D. removal | lbs | 65.8 |
| Air capacity (2 units) | cu. ft./day | 33,200 |
| Air required per pound B.O.D. removed | cu. ft | 504 |
| Total H.P. | | 6.5 |
| H.P. per pound B.O.D. removed | H.P | .099 |
| Total waste sludge | gal. per 48 hrs | 50 |

In comparison with the above figures, reference is made to the publication "An Industrial Waste Guide to the Milk Processing Industry," published by the Public Health Service of the Department of Health, Education, and Welfare, which on page 12 provides operating data for a typical activated sludge plant used to treat dairy wastes. As indicated in the data there assembled, the aeration time in a plant approximately the same size as that given in the above specific example, is about 40 hours, and well over 3,000 cubic feet of air per pound of B.O.D. are required.

The retention time of sixteen hours given in the example is quite low considering the extremely high B.O.D. of the raw waste product, and the reduction effected in the aeration treatment. With waste products of less strength, as for example, municipal waste products, the retention time is considerably lower and in most cases, is less than six hours, whereas with other types of mechanical aeration systems, at least eleven hours have been required to achieve the same B.O.D. removal. The same advantage is present in connection with the amount of air being employed. In most municipal sewage treatment systems, it is generally considered that one cubic foot of air is required for every gallon being treated. In the system of the present invention, however, the same B.O.D. reduction can be effected by as little as one tenth of a cubic foot of air per gallon.

The above-noted advantages are particularly important to the small manufacturing plant because the system of the present invention provides effective B.O.D. removal at a minimum of cost, including the initial expenditure, and a low amount of horsepower per unit of B.O.D. removed. Maintenance costs are reduced still further by the fact that the system lends itself very readily to automatic operation.

The present invention has been described as primarily directed to aeration of waste products, but the system of the present invention has wide applicability to diverse types of treating processes. These include processes involving mere physical absorption of the gas into the liquid and also those in which a chemical reaction takes place between the liquid and the gas. To cite a few examples, the system of the present invention is applicable to processes involving the introduction of carbon dioxide, oxygen, air, nitrogen, ammonia, or other gases into various liquid media for the purpose of purification, aeration, chemical synthesis, or for other purposes. Similarly, the type of liquid being treated may vary widely. For example, the present invention is applicable to the treatment of waste sulfite liquors obtained from the processing of wood into paper, the preparation of ammoniacal liquors for the Solvay process and other industrial processes, and numerous other types of liquids.

The process disclosed herein can also be used to effect the mixing of solid and liquid materials at very high efficiency. It is especially useful in effecting rapid dispersion or dissolution of solids and liquids in liquid solvents or carriers. All that is required is the introduction of the solid or liquid material to be mixed or dissolved into the cavitation zone, as described.

It will be apparent that various details of the above description can be changed without departing from the scope of the present invention.

I claim:

1. Apparatus for continuously treating raw liquid waste products to reduce the biological oxygen demand thereof comprising a treatment tank, an open-ended elongated hollow draft tube supported in a vertical position within said tank, means for feeding raw liquid waste products to be treated into said draft tube above the lower end of said draft tube, a rotor assembly supported for rotation about a vertical axis and located below the lower end of said draft tube, said assembly including a plurality of arms projecting radially outwardly with respect to said vertical axis and terminating at tip portions disposed radially outwardly beyond said draft tube, means connected to said assembly to rotate said arms about said axis, means at the tip portion of each arm operable upon rotation of said arms to create an annular zone of cavitationi within liquid in said treatment tank at a location below and radially outwardly with respect to the lower end of said draft tube, said tip portion means also being operable upon rotation of said arms to induce a flow of liquid downwardly through said draft tube and then through and past said annular zone of cavitation, means for continuously introducing oxygen-containing gas into said zone of cavitation and imparting a radial outward velocity to said gas sufficient to cause gas-containing bubbles to implode as said bubbles leave said zone of cavitation, a settling tank for collecting activated sludge, means for discharging liquid waste products from said treatment tank to said settling tank at a rate sufficient to maintain the level of liquid waste products in said treatment tank above the open upper end of said draft tube, and means for conducting activated sludge collected in said settling tank to said treatment tank.

2. An apparatus according to claim 1 wherein said means for conducting activated sludge collected in said settling tank to said treatment tank includes means for discharging activated sludge into said treatment tank at a location where the discharge sludge mixes with raw liquid waste products fed into said draft tube prior to first passage of said raw liquid waste products through said annular zone of cavitation.

3. An apparatus according to claim 1 wherein said means for conducting activated sludge is operable periodically to conduct activated sludge from said settling tank to said treatment tank.

4. Apparatus for treating liquid-borne waste material comprising a vessel having an inlet opening arranged to receive the material to be treated, and an outlet opening which maintains the liquid level in said vessel at a normal, predetermined height, a settling compartment having fluid communication with the outlet of said vessel and having an effluent discharge opening, a rotor located below the normal liquid level in said vessel, said rotor including a main central body portion and a vane element spaced from the axis of the rotor and extending at right angles to the plane of rotation of said rotor to project beyond the surface of the main body of the rotor, means for conducting air in gaseous form to the trailing edge of said vane element, said air conducting means comprising a hollow supporting shaft connected to said rotor and extending upwardly therefrom and means defining a passageway in said rotor main body providing communication between the interior of said hollow shaft and a position on said rotor immediately behind said vane, means operatively connected with said hollow shaft to rotate said shaft and rotor and produce regions of cavitation in the wake of said vane elements, means providing fluid communication between the lower portion of said settling compartment and said vessel, and a fluid recirculating means comprising a tube supported in said vessel in concentric relation to said hollow shaft, said tube terminating at its lower end adjacent said rotor and terminating at its upper end adjacent the normal liquid level in said vessel, whereby the rotation of said rotor causes liquid-borne waste material to be circulated downwardly through said tube and into the path of said rotor.

5. Apparatus for treating liquid-borne waste materials comprising a vessel having an inlet opening arranged to receive the material to be treated, and an outlet opening which maintains the liquid level in said vessel at a normal, predetermined height, said inlet opening being below the normal liquid level of said vessel, a settling compartment having fluid communication with the outlet of said vessel and having an effluent discharge opening a rotor located below the normal liquid level in said vessel, said rotor including a main central body portion and agitating means comprising a plurality of vane elements spaced from the axis of the rotor and extending at right angles to the plane of rotation of said rotor to project beyond the opposite surfaces of the main body of the rotor, means operable to rotate said rotor in the region traversed by said vane elements to produce regions of cavitation in the wake of said vane elements during the rotation thereof, means for introducing air directly into said regions of cavitation by conducting air in gaseous form to the trailing edges of said vane elements, said means comprising a hollow shaft connected to said rotor and means defining a passageway in said rotor main body from the interior of said shaft to a region immediately behind said agitation vanes, a fluid recirculating means comprising a tube supported in said vessel in concentric relation to said hollow shaft, said tube terminating at its lower end adjacent said rotor and terminating at its upper end adjacent the normal liquid in said vessel, said vane elements projecting outwardly from the lower end of said tube, whereby the rotation of said rotor causes liquid-borne waste material to be circulated downwardly through said tube and into the path of said rotor, and means providing fluid communication between the lower portions of said settling compartment and said vessel at a position where the liquid-borne waste material is circulated downwardly through said tube.

6. Apparatus for treating liquid-borne waste materials comprising a vessel having an inlet arranged to receive the material to be treated, and an outlet opening which maintains the liquid level in said vessel at a normal, predetermined height, a settling compartment having fluid communication with the outlet of said vessel and having an effluent discharge opening, a rotor located below the normal liquid in said vessel, said rotor including a main central body portion including a plurality of vane elements spaced from the axis of the rotor and extending at right angles to the plane of rotation of said rotor to project beyond the opposite surfaces of the main body of the rotor, means for conducting air in gaseous form to the trailing edges of said vane elements, said air conducting means comprising a hollow shaft supportingly connected to said rotor and extending upwardly therefrom and means defining a passageway in said rotor main body providing communication between the interior of said hollow shaft and positions on said rotor immediately behind said vanes, means operatively connected with said hollow shaft to rotate said shaft and rotor and produce regions of cavitation in the wake of said main elements, a fluid recirculating means comprising a tube supported in said vessel in concentric relation to said hollow shaft, said tube terminating at its lower end adjacent said rotor and terminating at its upper end adjacent the normal liquid level in said vessel, whereby the rotation of said rotor causes liquid-borne waste material to be circulated downwardly through said tube and into the path of said rotor, and means providing fluid communication between the lower portion of said settling compartment and said vessel at a position where the liquid-borne waste material is circulated downwardly through said tube.

References Cited by the Examiner

UNITED STATES PATENTS

| | | | |
|---|---|---|---|
| 1,194,933 | 8/16 | Barber | 210—8 |
| 1,242,445 | 10/17 | Ittner | 261—121 |
| 1,254,836 | 1/18 | Malloy | 210—8 |
| 1,902,078 | 3/33 | Jenks | 210—8.1 |
| 1,921,220 | 8/33 | Daman | 261—93 |
| 2,094,004 | 9/37 | Drake | 261—87 |
| 2,187,746 | 1/40 | Lefevre | 261—87 |
| 2,225,437 | 12/40 | Nordell | 210—8 |
| 2,244,902 | 6/41 | Stich | 261—93 X |
| 2,246,560 | 6/41 | Weinig et al. | 261—93 |
| 2,293,183 | 8/42 | Walker | 210—220 X |
| 2,316,770 | 4/43 | Daman et al. | 209—169 |
| 2,348,125 | 5/44 | Green | 210—8 |
| 2,393,976 | 2/46 | Daman et al. | 209—169 |
| 2,394,413 | 2/46 | Walker | 210—49 X |
| 2,479,403 | 8/49 | Powers | 210—8 |
| 2,515,538 | 7/50 | Wall | 210—169 |
| 2,615,842 | 10/52 | Kraus | 210—8 |

MORRIS O. WOLK, *Primary Examiner.*

JOHN R. SPECK, CORNELIUS D. ANGEL, CARL F. KRAFFT, *Examiners.*